US012590262B2

(12) United States Patent
Lee et al.

(10) Patent No.: US 12,590,262 B2
(45) Date of Patent: Mar. 31, 2026

(54) ANTI-FRICTION COMPOSITE MATERIAL

(71) Applicants: DUPONT SPECIALTY PRODUCTS USA, LLC, Wilmington, DE (US); DDP Specialty Electronic Materials US 9, LLC, Midland, MI (US)

(72) Inventors: Hau-Nan Lee, Wilmington, DE (US); Gary Weber, Midland, MI (US); John P. Cunningham, Lincoln University, PA (US); Jennifer Vail, Wilmington, DE (US)

(73) Assignee: DUPONT SPECIALTY PRODUCTS USA, LLC

( * ) Notice: Subject to any disclaimer, the term of this patent is extended or adjusted under 35 U.S.C. 154(b) by 0 days.

(21) Appl. No.: 18/564,486

(22) PCT Filed: Jun. 22, 2022

(86) PCT No.: PCT/US2022/073074
§ 371 (c)(1),
(2) Date: Nov. 27, 2023

(87) PCT Pub. No.: WO2022/272256
PCT Pub. Date: Dec. 29, 2022

(65) Prior Publication Data
US 2024/0182808 A1 Jun. 6, 2024

Related U.S. Application Data

(60) Provisional application No. 63/213,833, filed on Jun. 23, 2021.

(51) Int. Cl.
| | |
|---|---|
| *C10M 111/04* | (2006.01) |
| *C08J 7/04* | (2020.01) |
| *C10M 103/02* | (2006.01) |
| *C10M 103/06* | (2006.01) |
| *C10M 107/38* | (2006.01) |
| *C10M 107/44* | (2006.01) |
| *F16C 33/20* | (2006.01) |
| *C10N 40/02* | (2006.01) |
| *C10N 40/34* | (2006.01) |
| *C10N 50/00* | (2006.01) |
| *C10N 50/02* | (2006.01) |

(52) U.S. Cl.
CPC .......... *C10M 111/04* (2013.01); *C08J 7/0427* (2020.01); *C10M 103/02* (2013.01); *C10M 103/06* (2013.01); *C10M 107/38* (2013.01); *C10M 107/44* (2013.01); *F16C 33/20* (2013.01); *C08J 2379/08* (2013.01); *C08J 2479/08* (2013.01); *C10M 2201/0413* (2013.01); *C10M 2201/0663* (2013.01); *C10M 2213/0623* (2013.01); *C10M 2217/0443* (2013.01); *C10N 2040/02* (2013.01); *C10N 2040/34* (2013.01); *C10N 2050/02* (2013.01); *C10N 2050/023* (2020.05)

(58) Field of Classification Search
CPC .............. C10M 111/04; C10M 103/02; C10M 103/06; C10M 107/38; C10M 107/44; C10M 2201/0413; C10M 2201/0663; C10M 2213/0623; C10M 2217/0443; C08J 7/0427; C08J 2379/08; C08J 2479/08; F16C 33/20; F16C 2240/60; F16C 33/205; F16C 33/208; F16C 33/201; F16C 2202/50; F16C 2208/40; F16C 2208/42; F16C 2208/44; C10N 2040/02; C10N 2040/34; C10N 2050/02; C10N 2050/023
See application file for complete search history.

(56) References Cited

U.S. PATENT DOCUMENTS

| | | | |
|---|---|---|---|
| 2017/0081522 A1 | 3/2017 | Adam et al. | |
| 2017/0211006 A1 | 7/2017 | Yamasaki | |
| 2018/0362873 A1 | 12/2018 | Sasaki et al. | |

FOREIGN PATENT DOCUMENTS

| | | | | |
|---|---|---|---|---|
| EP | 0905665 A2 | | 3/1999 | |
| GB | 2509166 A | | 6/2014 | |
| JP | Hei 06-283029 A | | 10/1994 | |
| JP | 2001031906 A | | 2/2001 | |
| JP | 2001200849 A | * | 7/2001 | |
| JP | 2018021125 A | | 2/2018 | |

* cited by examiner

*Primary Examiner* — Taiwo Oladapo
(74) *Attorney, Agent, or Firm* — Matthew T. Fewkes

(57) ABSTRACT

Anti-friction composite material having: (A) polyimide substrate and (B) a coating layer containing a binder resin and a solid lubricant.

11 Claims, No Drawings

ANTI-FRICTION COMPOSITE MATERIAL

CROSS-REFERENCE TO RELATED APPLICATION

This application claims the benefit of U.S. Provisional Application No. 63/213,833, filed on Jun. 23, 2021, the disclosure of which is hereby expressly incorporated herein by reference in its entirety.

FIELD OF DISCLOSURE

This invention relates to an anti-friction composite material of polyimide substrate and a coating layer having a binder resin and a solid lubricant.

BACKGROUND

Low friction and low wear properties are sometimes required for components used for automotive industry or aerospace industry. For example, metal or ceramic materials can be coated with a polymeric antifriction coating. Normally, anti-friction coating (AFC) contains solid lubricants and matrix resin, which can form a coating layer on an article. Solid lubricants help to provide lower friction surfaces. Graphite, molybdenum disulfide and flouoropolymer particle such as PTFE are known as solid lubricants. Several patents and publications are cited in the description in order to more fully describe the state of the art to which this invention pertains. US20120106882A discloses bushings which have friction reducing layer, the layer is casted on the surface of bushings. WO2014/021477A discloses a coating composition comprising polyamideimide binder resin, solid lubricant and a specific solvent.

Combining materials with anti-friction properties to form composite materials needs to recognize adhesion properties in creating these materials. An appreciation of the properties of the individual components and adhesion issues to form the new composition materials will provide a synergistic anti-friction quality.

Application of a polymeric coating with lower thermal and mechanical properties on a polyimide part (better thermal/mechanical properties) to create a new material with superior antifriction performance is not common but is needed in multiple industries.

BRIEF SUMMARY

Provided herein are material and processes for a composite material of polyimide coated by a polymeric coating, having superior anti-friction qualities and durability.

In one embodiment the invention is direct to a composite material comprising (A) polyimide substrate and (B) a coating layer comprising a binder resin and a solid lubricant, wherein at least a part of the surface of the polyimide substrate is covered by the coating layer.

In another embodiment, the invention is directed to a process of preparing the composite material, comprising the steps of (i) preparing a polyimide substrate, (ii) applying a coating composition comprising a binder resin, a solid lubricant and a solvent to the polyimide substrate; and (iii) curing the coating composition.

In further embodiment, the invention is directed to articles formed of the composition described above.

Further embodiment, the invention is directed to a sliding structure comprising a first part made from polyimide and a second part made from a metal, the first part and the second part are contacted each other, at least one of the surface of the two parts is covered by a coating layer, wherein the coating layer comprises (A) polyimide substrate and (B) a coating layer comprising a binder resin and a solid lubricant.

DETAILED DESCRIPTION

Disclosed herein are composite materials comprising (A) polyimide substrate and (B) a coating layer comprising a binder resin and a solid lubricant.

(A) Polyimide Substrate

Polyimides are high temperature engineering polymers which exhibit an exceptional combination of thermal stability, mechanical toughness, and chemical resistance. They have excellent dielectric properties and inherently low coefficient of thermal expansion. They are formed from diamines or diisocyanates and dianhydrides. DuPont Vespel® products are highly durable polyimides used in demanding applications where exceptional thermal resistance, low wear and/or low friction, strength and impact resistance are desired as custom parts or stock shapes. Those polyimides are used as a polyimide substrate of the invention. The polyimide substrate can comprise additives, such as solid lubricants, reinforcing fillers or any other functional fillers to enhance thermal, mechanical, electric and/or tribological properties. The polyimide substrate can be processed by a wide variety of forms, such as injection or compression moldings.

(B) Coating Layer

Coating layer comprises (B-1) a binder resin and (B-2) a solid lubricant.

(B-1) Binder Resin

The binder resin works as a binder to disperse a solid lubricant and optionally any other additional elements in a coating layer. Any resin can be used. Examples of the binder resin include, without limitation, polyamide-imides, epoxy, phenolic resin, polyurethane, polybutyl titanate, or blends of said resins. Preferably the binder resin is polyamide-imides. Polyamideimides are either thermosetting or thermoplastic, amorphous polymers that have exceptional mechanical, thermal and chemical resistant properties. Polyamideimides are used extensively as coating and prepared from isocyanates and TMA (trimellic acid-anhydride) in N-methyl-2-pyrrolidone (NMP). Polyamideimides display a combination of properties from both polyamides and polyimides, such as high strength, good lubricity, melt processability, exceptional high heat capability, and broad chemical resistance.

(B-2) Solid Lubricant

Solid lubricant has a function of improving the friction of the coating layer. Examples of the solid lubricant includes, without limitation, molybdenum disulfide, graphite and fluorine resins such as polytetrafluoroethylene (PTFE), tetrafluoroethylene-perfluoroalkyl vinyl ether copolymers and tetrafluoroethylene-hexafluoripropymene copolymers and combination thereof. The average primary particle diameter of the solid lubricant is preferably from 0.1 to 20 micrometers and particularly preferably from 0.1 to 10 micrometers. The average primary particle diameter of the solid lubricants can be measured by observations using an electron microscope or with a laser diffraction and scattering method. The content of the solid lubricant in the coating layer is preferably from 5 to 90 weight %, more preferably from 15 to 50 weight % based on the weight of coating layer.

(B-3) Other Additives

The coating layer can further comprise other additional elements, such as a hard particle, a UV absorber, an antioxidant, a thermal polymerization inhibitor and a leveling agent. Examples of a hard particle include, without limitation, tungsten disulfide, aluminum oxide, zinc oxide, and polymer particles such as polyethylene particles and polyamide particles. The average primary particle diameter of the solid particle is preferably from 0.1 to 20 micrometers and particularly preferably from 0.1 to 10 micrometers. The average primary particle diameter of the solid particle can be measured by the same method disclosed above for the solid lubricant. When the coating layer contains solid lubricant, the total contents of the solid lubricant and solid particle is fall within the ranges from 5 to 90 weight %, based on the weight of coating layer.

(C) Process to Prepare a Composite Material

The coating layer can be processed by applying a coating composition comprising a binder resin, a solid lubricant and a solvent; on the surface of polyimide substrate. Binder resin and solid lubricant are disclosed above so the description of these can be incorporated here. Solvent is used to dissolve the binder resin, as well as to disperse a solid lubricant and other additional elements in the composition. Examples of the solvent include, without limitation, N-methyl-2-pyrrolidone (NMP), N-ethyl pyrrolidone (NEP), N,N,-dimethylacetamide, N,N-dimethylformamide, and 1,3-dimethyl-2-imidazolidinone (DMI). A prominent distributor of polyamideimides is DuPont which uses the trademark; Molykote®. The polyamideimide anti-friction coatings (PAI AFCs) can be found under the trade name Molykote® from DuPont USA Inc.

The coating composition can be applied at least a part of the surface of the polyimide substrate, by wide variety of forms. Examples of methods for applying the coating composition include, without limiting, dipping, spin coating, flow coating, spraying, bar-coating, gravure coating, roll coating, blade coating, and air knife coating. The thickness of applied coating composition is not particularly limited, but the thickness is preferably from 5 to 25 micrometers. After applying the coating composition, the applied composition is dried to remove the solvent, and if necessary, further cured to form stable coating layer.

An exemplary process of applying an AFC layer to a polyimide substrate is that; a coating composition is applied to the substrate via HVLP (high volume/low pressure) spray equipment utilizing orifice diameter between 0.8 to 1.5 mm and pressures from 10 to 75 psi. Parts are typically preheated before coating application and after a solvent wash to remove all solvents and residual oils on the surface. Coating is generally applied to the substrates in thin even coats to achieve a desired dry film build required for a given application (typically 10 to 30 micrometers).

Drying/curing is a two-step process with a low temperature flash at 80 degrees C. or lower temperature for 5 to 10 minutes to drive off the majority of the solvent. Additional coats can be applied to the parts to achieve target film build after this flash process. A final heat cure is required and slightly differs based on the resin chemistry of each coating, but generally speaking, 230° C. for 60 minutes is a common cure profile for these coatings applied to the polyimide substrates.

(D) Article

The article of the invention comprises polyimide, in which at least a part of the surface of the article is covered by an anti-friction coating comprising a binder resin and a solid lubricant disclosed above. Examples of such article include, wear rings, bushings, thrust washers, bumper, wear pads, wear strips, tube clamps, bearings, insulators, valve seats, seals, and shroud. The article of the invention can be used for aerospace industries and transportation industries including automotive.

(E) Sliding Structure

In another embodiment of the invention, the coating composition can also be applied to the "counter" surface; commonly made of metal, in systems including the present invention in e.g. the automotive and aerospace industries. Therefore, the another embodiment of the invention is a sliding structure comprising the first part made from polyimide and the second part made from a metal, the first part and the second part are contacted each other, at least one of the surface of the two parts is covered by a coating layer, wherein the coating layer comprises (A) polyimide substrate and (B) a coating layer comprising a binder resin and a solid lubricant.

Adhesive Qualities

The adhesion mechanism between these two materials is primarily mechanical in that the more surface area exposed, the more adhesion sites there is for the PAI resin to bond to the polyimide. This is primarily due the to the compression molding manufacturing method and the inherent micro pores in polyimide that may allow for a higher ratio of surface area contact. It is critical to ensure all the solvent trapped in the micro pores is evaporated before coating or this can lead to blistering of the coating surface. This has been achieved by pre-heating the polyimide parts to above the flashpoint of the solvent used for degreasing or over 100 C to drive off any residual moisture, whichever is higher. After cure, parts can be allowed to cool to ambient temp before handling. Cure temperatures of the PAI coatings based on adhesion testing results via cross-cut tape peel testing, pencil hardness testing, and waterjet pressure testing.

EXAMPLES

Materials

Polyimide substrate (SP21): Vespel® SP21 provided by DuPont was used. Dupont™ Vespel® SP-21 is graphite-enhanced with low-friction for use with or without lubrication in various applications. Vespel® SP-21 has maximum physical strength, elongation, and toughness. Available as custom parts or stock shapes.

The formulations of coating compositions used in Examples are shown in Table 1.

TABLE 1

| | Coating Composition | | | |
| | A | B | C | D |
| --- | --- | --- | --- | --- |
| Binder | PAI | PAI | PAI | PAI |
| MoS$_2$ | — | 17 | 19 | — |
| Graphite | 20 | 12 | 4 | — |
| PTFE | — | 16 | — | 25 |
| CaF$_2$ | — | — | — | 2 |
| TiN | 11 | — | — | — |
| WC | 3 | — | — | — |
| Solvent | NMP | NMP | — | — |
| Solid contents (vol %) | 35 | 45 | 23 | 27 |

Vol % is based on the weight of total solid contents.

Coating Method

The coating compositions A to D of Table 1 was applied on the PI substrate or a metal counter article by spray application, with the thickness of 20+/−2 micrometers. Then the PI substrate/metal counter article was heated at 80 degrees C. for 10 minutes, by putting the substrate/metal counter article in an oven. Then the composition was cured under 220 degrees C. for 60 minutes. Then volume loss and Coefficient of Friction (COF) were evaluated.

Examples 1-3

Friction and wear testing were done using a thrust washer setup according to ASTM D3702. Samples were tested at a pressure of 1.75 MPa, velocity of 0.7 m/s, for 24 hours, against 6061 aluminum. The wear of the coated PI substrate is measured by the change in sample height then calculated the volume lost during the test. The smaller the volume loss means the lower the wear.

When coated with Coating composition A, the coated SP21's volume loss improved from 46.1 mm$^3$ to 30.1 mm$^3$. SP21 coated with Coating composition B had a volume loss of 29.5 mm$^3$.

TABLE 2

| Examples | Coating Composition | Volume Loss (mm$^3$) | St Dev | Average COF | St Dev |
|---|---|---|---|---|---|
| 1 | — | 46.1 | 30.49 | 0.33 | 0.032 |
| 2 | A | 30.1 | 23.65 | 0.34 | 0.012 |
| 3 | B | 29.5 | 17.78 | 0.33 | 0.023 |

St Dev: Standard Deviation

Examples 4-6

Friction and wear testing were done using a thrust washer setup according to ASTM D3702. Samples were tested at a pressure of 1.75 MPa, velocity of 0.7 m/s, for 24 hours, against 7075 aluminum. The wear of the coated polymer washer is measured by the change in sample height then calculated the volume lost during the test. The smaller the volume loss means the lower the wear. Uncoated SP21 was unable to complete 24 hours of testing due to high wear; Coating compositions A and B both enabled the test to run to completion.

When the aluminum surface was coated with Coating composition A, SP21's volume loss improved from 145.8 mm$^3$ over 8 hours to 5.14 mm$^3$ over 24 hours. SP21 coated with Coating composition B had a volume loss of 0.27 mm$^3$ over 24 hours.

TABLE 3

| Examples | Coating composition | Vol Loss (mm3) | St Dev | Avg COF | St Dev | Duration (hours) | St Dev |
|---|---|---|---|---|---|---|---|
| 4 | — | 145.8 | 2.48 | 0.22 | 0.00345 | 6.59 | 1.49 |
| 5 | A | 5.14 | 1.13 | 0.40 | 0.00334 | 24.00 | 0 |
| 6 | B | 0.27 | 0.034 | 0.31 | 0.00496 | 24.00 | 0 |

St Dev: Standard Deviation

Examples 7-11

Friction and wear testing were done using a block-on ring test machine according to ASTM G137. Samples were tested at a pressure of 1.29 MPa, velocity of 0.68 m/s, for 24 hours, against 7075 aluminum ring. The wear of the polymer block is measured by the change in sample height then calculated the volume lost during the test. The smaller the volume loss means the lower the wear.

When the aluminum ring coated with Coating compositions A to D, SP21's volume loss and the wear in the aluminum ring improved significantly, as shown in Table 4.

TABLE 4

| Examples | Coating composition | Vol Loss (in3) on SP21 | Wear on Al surface (in) |
|---|---|---|---|
| 7 | — | 0.0057 | 0.0353 |
| 8 | C | 0.0003 | 0.0009 |
| 9 | B | 0.0006 | 0.0028 |
| 10 | A | 0.0004 | 0.0016 |
| 11 | D | 0.0016 | 0.0089 |

What we claimed is:

1. A composite material comprising:
(A) polyimide substrate and
(B) a coating layer comprising a binder resin and a solid lubricant,
wherein at least a part of the surface of the polyimide substrate is covered by the coating layer, and wherein the amount of a solid lubricant is from 50 to 90 weight % based on the weight of the coating layer.

2. The composite material of claim 1, wherein the binder resin comprises polyamideimide.

3. The composite material of claim 1, wherein the solid lubricant is selected from molybdenum disulfide, fluorine resins and graphite.

4. The composite material of claim 1, wherein the coating layer further comprises a particle, wherein the particle comprises tungsten disulfide, aluminum oxide, zinc oxide, polyethylene or polyamide.

5. The composite material of claim 1, wherein the thickness of the coating layer is from 5 to 100 micrometers.

6. A process of preparing a composite material of claim 1, comprising the steps of:
(i) preparing a polyimide substrate,
(ii) applying a coating composition comprising a binder resin, a solid lubricant and a solvent to the polyimide substrate; and
(iii) curing the coating composition
wherein the coating composition comprises 15 to 95 weight % of a binder resin, 5 to 85 weight % of solid lubricant and 25 to 85 weight % of solvent.

7. The process of claim 6, wherein the solvent is selected from N-methyl-2-pyrrolidone, N-ethyl pyrrolidone, N,N,-dimethylacetamide, N,N-dimethylformamide, and 1,3-dimethyl-2-imidazolidinone.

8. The process of claim 6, wherein the coating composition is applied to the polyimide substrate by spray coatings.

9. An article comprising polyimide, in which at least a part of the surface of the article is covered by an anti-friction coating comprising a binder resin and a solid lubricant wherein the amount of a solid lubricant in the anti-friction coating is from 50 to 90 weight % based on the weight of the anti-friction coating.

10. The article of claim 9, wherein the article is selected from wear rings, bushings, thrust washers, bumper, wear pads, wear strips, tube clamps, bearings, insulators, valve seats, seals, and shroud.

11. A sliding structure comprising a first part made from polyimide and a second part made from a metal, the first part and the second part are contacted each other, at least one of the surface of the two parts is covered by a coating layer, wherein the coating layer comprises (A) polyimide substrate and (B) a coating layer comprising a binder resin and a solid lubricant wherein the amount of a solid lubricant in the coating layer is from 50 to 90 weight % based on the weight of the coating layer.

\* \* \* \* \*